(12) United States Patent
Klein et al.

(10) Patent No.: US 11,956,855 B2
(45) Date of Patent: Apr. 9, 2024

(54) DYNAMIC ROAMING

(71) Applicants: AT&T Mobility II LLC, Atlanta, GA (US); AT&T Intellectual Property I, L.P., Atlanta, GA (US)

(72) Inventors: Robert S. Klein, Manchester, CT (US); Mohammed Yousuffi, Lawrenceville, GA (US); Nathan Stowell, Lake Stevens, WA (US); Senthil Raj Dhandapani, Weston, MA (US); Daniel Powell, Kirkland, WA (US); Iftekhar Alam, Roswell, GA (US); Slawomir Stawiarski, Carpentersville, IL (US); William Turczyn, Clinton, NY (US); Ngwane Maina, Marietta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 64 days.

(21) Appl. No.: 17/499,483

(22) Filed: Oct. 12, 2021

(65) Prior Publication Data
US 2023/0110429 A1 Apr. 13, 2023

(51) Int. Cl.
*H04W 8/12* (2009.01)
*H04W 8/26* (2009.01)
*H04W 60/04* (2009.01)

(52) U.S. Cl.
CPC ............... *H04W 8/12* (2013.01); *H04W 8/26* (2013.01); *H04W 60/04* (2013.01)

(58) Field of Classification Search
None
See application file for complete search history.

(56) References Cited

U.S. PATENT DOCUMENTS

| | | | |
|---|---|---|---|
| 2018/0103379 A1* | 4/2018 | Smith | H04W 72/04 |
| 2019/0116529 A1* | 4/2019 | Lu | H04W 36/0069 |
| 2021/0136583 A1* | 5/2021 | Gundavelli | H04W 8/02 |

* cited by examiner

*Primary Examiner* — Kouroush Mohebbi
(74) *Attorney, Agent, or Firm* — Guntin & Gust, PLC; Mark Wilinski (57) ABSTRACT

A system enables a home operator to establish an automated monitoring process which identifies outage events on competitor wireless networks (e.g., peer operators) operating in the same geographies as home operator. The home operator then is able to selectively offer, in near real-time, to open roaming to the peer operator, or implement roaming automatically based on predefined and mutually agreed upon rule sets. The monitoring process may observe non-customer attach request volumes in order to identify outage events on competitor wireless networks.

20 Claims, 7 Drawing Sheets

DYNAMIC ROAMING

BACKGROUND

A cellular device connects with a home wireless provider that operates a "home network" for the cellular device. If the cellular device is somewhere that is not covered by the home network, the cellular device looks to communicate with other networks that do provide coverage.

When the cellular device connects with another wireless provider's network, the visited network identifies the home country and home network of the cellular device. If there is a roaming agreement between the home wireless provider and the other (e.g., visited) network, the cellular device will be able to connect to the "visited network" and make calls, use apps, or send emails just as normally would be done on the home network. Even if the visited network does not allow roaming to the cellular device based on their home network, the visited network still records the attempted access which is relevant information for use in the disclosed subject matter herein.

This background information is provided to reveal information believed by the applicant to be of possible relevance. No admission is necessarily intended, nor should be construed, that any of the preceding information constitutes prior art.

SUMMARY

The disclosed subject matter enables a home operator to establish an automated monitoring process which identifies outage events on competitor wireless networks (e.g., peer operators) operating in the same geographies as home operator. The home operator then is able to selectively offer, in near real-time, to open roaming to the peer operator, or implement roaming automatically based on predefined and mutually agreed upon rule sets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Currently operators are unaware of the status of peer operators' networks. This status information can be useful to know because when a peer operators' network goes down, the customer devices from that peer operator seek an alternate provider, even if only for the ability to perform emergency calls (e.g., E911 only mode). The signaling exchanges between the peer operators' customers' devices and the unaffected home operator's network requires some amount of cell site capacity to be consumed. So even if there are no standing roaming agreements there are resource considerations when a peer operator has an outage event. Currently the discussion of when and where to open roaming between operators is done "manually." With each operator monitoring their own network and deciding when to ask the other operator to open an area (e.g., a TAC) for roaming, which may typically occur during/following a severe weather event, or when one operator incurs a major service affecting core network outage.

The disclosed subject matter may incorporate monitoring of cause codes (CCs) from the MMEs and processing those continually to first identify a normal level of those counts on each home operator network element (e.g., eNB or gNB) from each peer operator. Additionally, it includes a process to identify when a significant deviation has occurred and on which eNB/gNBs by which peer operator(s). In addition, the disclosed subject matter includes a mechanism to notify the home operator of the breached condition and optionally commences a process by which the status (e.g., sites in/out of service, capacity remaining, voice accessibility/retainability, data throughput) of the home operator network in the affected geography is queried and compared to a baseline. If the home operator's network is able to support additional voice and data traffic, then there is a way for the home operator's network in the peer operator's affected area to be opened for the devices of the peer operator to roam.

Figure 1:
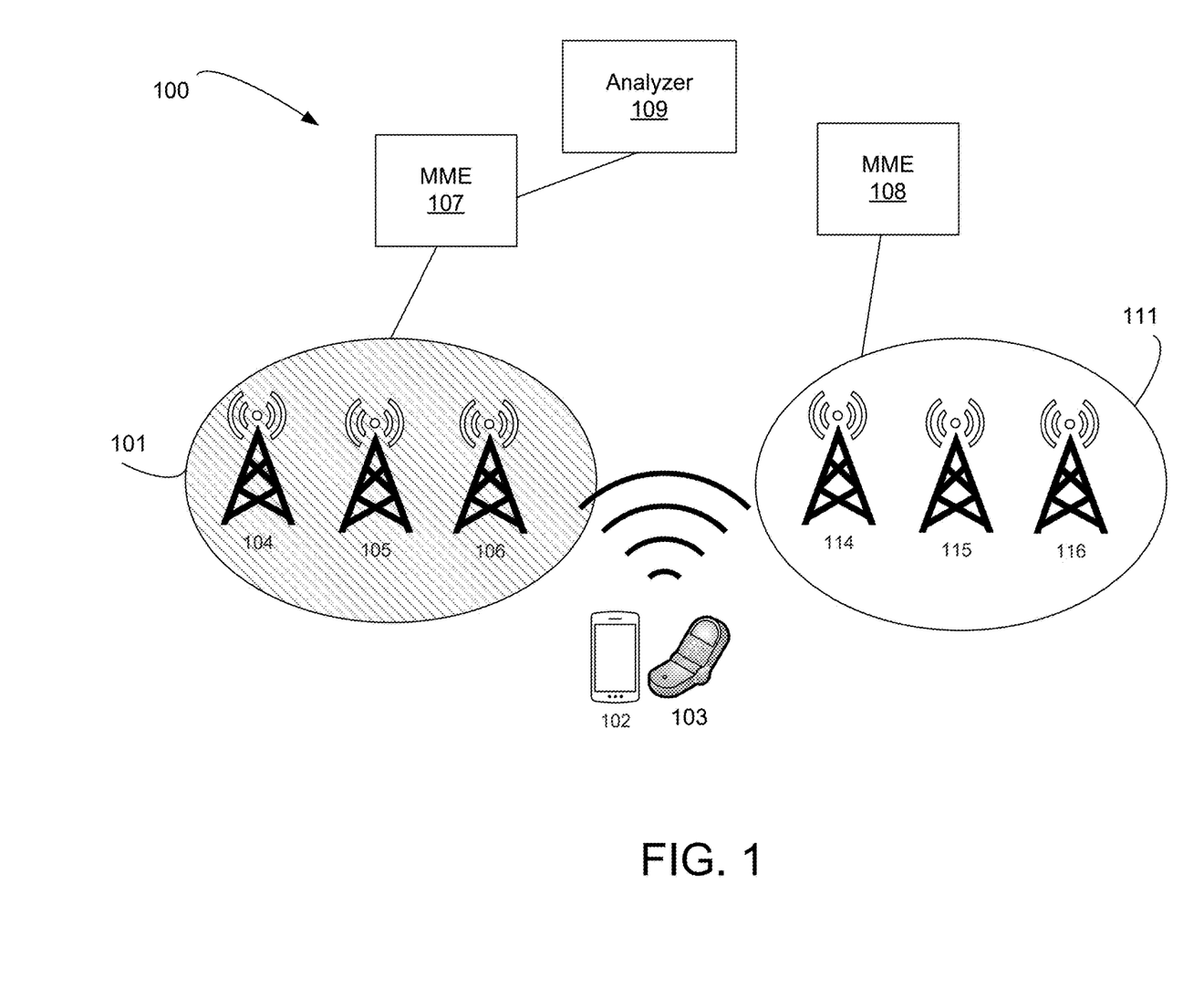
FIG. 1 illustrates an exemplary system for implementing dynamic roaming.

FIG. 1 illustrates an exemplary system for implementing dynamic roaming. System 100 may include multiple base stations, within multiple tracking area codes (TAC), that are connected with MME 107 or MME 108. TAC 101 may include base station 104, base station 105, and base station 106 and TAC 111 may include base station 114, base station 115, and base station 116. TAC 101 is the home network of user equipment (UE) 102, while TAC 111 is the home network of UE 103. TAC 101 and TAC 111 may be operated by different wireless service providers. UE 102 and UE 103 are within wireless range of base station 106 and base station 114. Analyzer 109 may receive and analyze information, which may be from MME 107 or base station 104—base station 106. Analyzer 109 may be a standalone device or integrated into one or more devices (e.g., MME 107 or MME 108). As disclosed in more detail herein, the information may include RRC Attempts by OpX (e.g., first service provider—TAC 101) UEs (RRC_AttemptsOpXUEs), RRC Attempts by OpY (e.g., second service provider—TAC 111) UEs (RRC_AttemptsOpYUEs), rejection of attach requests for OpY UEs (RRC_RejofAttachforOpYUEs), radio resource control (RRC) roaming NOT allowed (RRC_RNA), RRC roaming activation threshold (RRC_RAT), RRC maximum users (RRC_MAX), RRC roaming Deactivation Ratio (RRC_RDR), or Roaming Enabled TACs (RETs).

Figure 2:
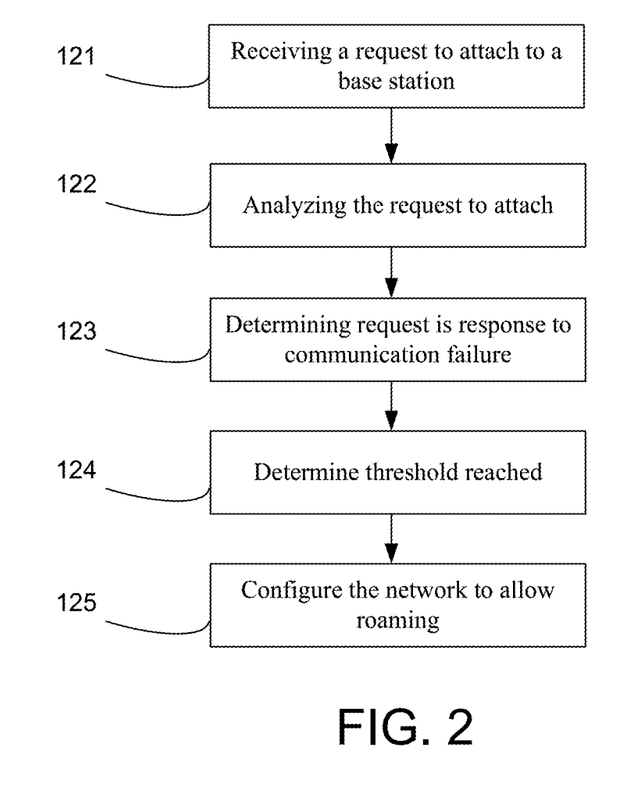
FIG. 2 illustrates an exemplary method for implementing dynamic roaming.
Figure 3:
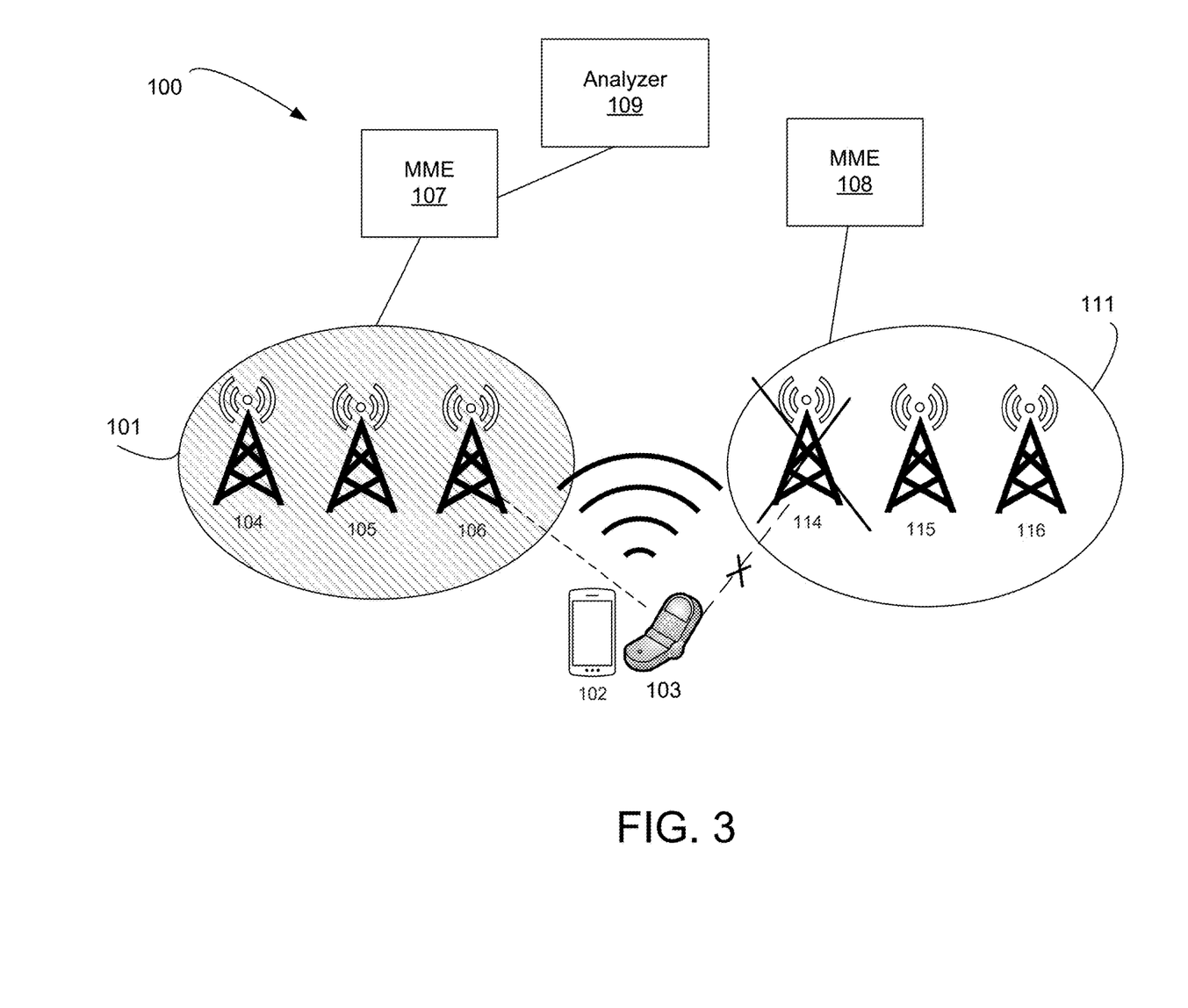
FIG. 3 illustrates an exemplary system for implementing dynamic roaming.

FIG. 2 illustrates an exemplary method for implementing dynamic roaming. In an exemplary scenario as shown in FIG. 3, UE 103 may not be able to connect with any of the base stations in TAC 111. TAC 111 may be associated with a second service provider and is the home network of UE 103. The outage may be the result of a technical/software issue, a weather event, or another failure. At step 121, analyzer 109 may receive an indication of an attach request.

The attach request may be initially received by base station 106. Subsequently, MME 107 that is connected with TAC 101 and then analyzer 109 may receive an indication of the attach request. TAC 101 may be associated with a first service provider and is a visitor network for UE 103.

At step 122, analyzing the attach request of step 121 by analyzer 109. At step 123, based on the analysis of step 122, determining that the attach request is indicative of a response to a failure of UE 103 to connect with a base station of TAC 111. The attach request (or another message) may be a type of request that often occurs when there is unavailability of a home network. A particular cause code or the like may be within the attach request or similar message. In an example, when the home network is unavailable to UE 103, then UE 103 may attempt to connect with a base station of another provider (e.g., TAC 101) in order keep emergency services (e.g., 911) available to UE 103.

At step 124, determining that a threshold number of a first type of request is reached. The first type is associated with the indication of step 123. The threshold may be based on a request of just a single UE (e.g., UE 103) or multiple UEs over a period. At step 125, analyzer 109 (or another device) may provide instructions to configure network equipment of the first provider network (e.g., base station 104—base station 106, MME 107, etc.) to allow roaming for one or more UEs of the second provider network. The allowed roaming may be designated for a single base station, multiple base stations (e.g., TAC 101 or smaller defined area), or the like.

Figure 4:
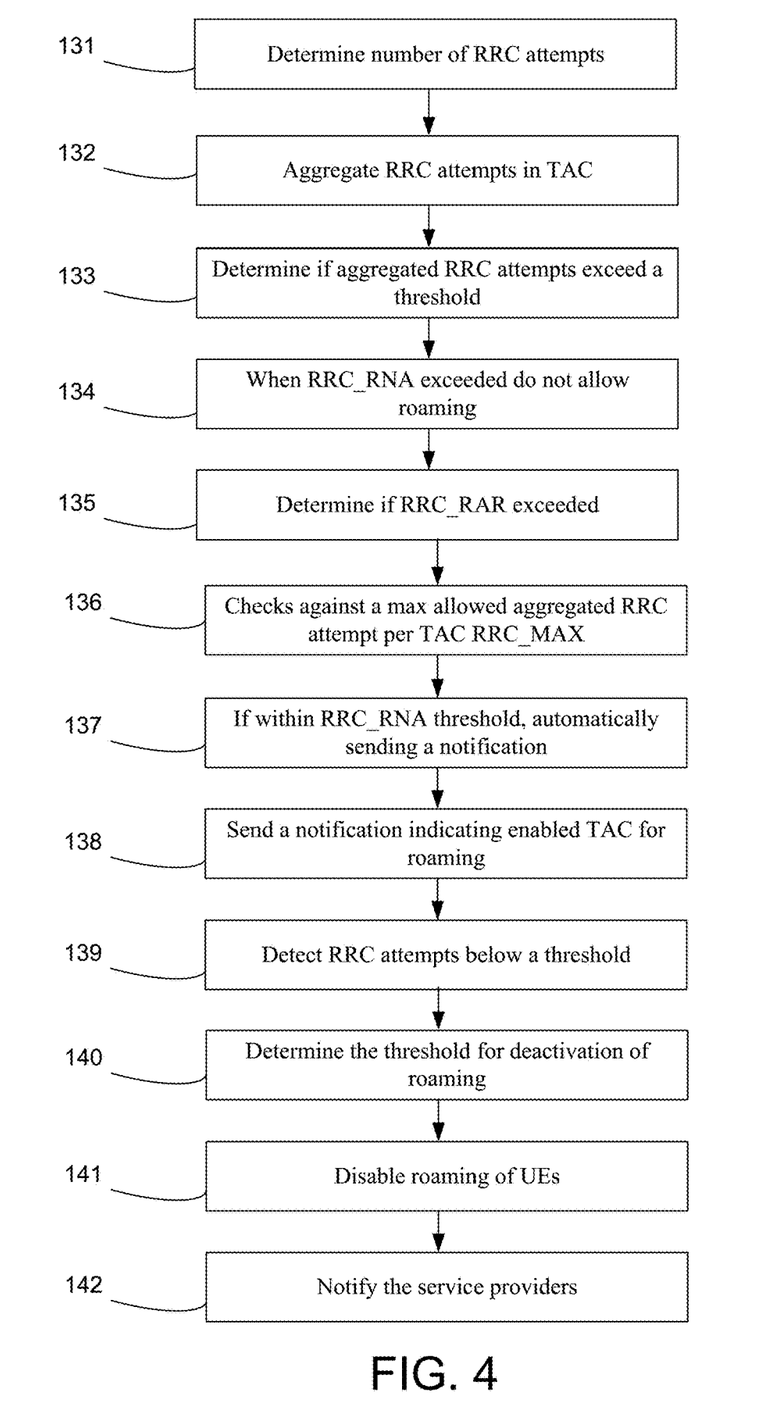
FIG. 4 illustrates an exemplary method for implementing dynamic roaming.

FIG. 4 illustrates an exemplary method for implementing dynamic roaming. At step 131, analyzer 109, associated with the first service provider, determines the number of RRC attempts within a period (e.g., within a number of minutes or hours). There may be recordation and consideration of RRC attempts associated with UEs of the first service provider network (e.g., UE 102), UEs of the second provider network (e.g., UE 103), or both.

At step 132, analyzer 109 may aggregate the RRC attempts per predefined TAC area on the first service provider network, the second provider network, or both per report output period (ROP).

At step 133, analyzer 109 determines if aggregated RRC attempts exceed a threshold for one or more of the TACs (e.g., TAC 101) of the first service provider network. This may be referred to herein as RRC_RNA (RRC roaming NOT allowed).

At step 134, when analyzer 109 detects RRC attempts associated with a TAC that exceed RRC_RNA, instructions are provided to the first service provider network to NOT allow roaming on TACs that RRC attempts exceeded RRC_RNA. Analyzer 109 may check TACs of the first service provider network or the second service provider that do not exceed RRC_RNA (RRC roaming NOT allowed). It is contemplated that a check of TAC information of the second service provider by the first provider would be implemented, only if the second service provider shared such information.

At step 135, analyzer 109 (e.g., self-optimizing network—SON) detects RRC attempts by UEs of the second service provider and subsequently rejects on a site exceed threshold RRC_RAR (RRC roaming activation threshold) for a period (e.g., hysteresis time period).

At step 136, analyzer 109 also checks against a max allowed aggregated RRC attempt per TAC RRC_MAX before roaming is allowed.

At step 137, based on max allowed RRC attempt per TAC is less than RRC_MAX and being within (e.g., less than) the RRC_RNA threshold, an automatic notification could be sent. The notification may be instructions to enable a UE (or more UEs) of the second service provider (e.g., UE 103) to roam on the entire TAC that the trigger site belongs or an alert about the status of the second service provider, which may be used for subsequent network planning or marketing.

At step 138, analyzer 109 may notification to the second service provider (e.g., to MME 108) indicting which of the first service provider's TAC(s) have been enabled for roaming.

At step 139, analyzer 109 detect RRC attempts by UEs of the second provider on a site that is below a threshold RRC_RDT (e.g., RRC Roaming Deactivation Threshold) on the roaming active TACs for a hysteresis time period.

At step 140, based on triggers (e.g., RRC_RDT to follow cause code 11 or 13), determine the threshold for deactivation of roaming.

At step 141, analyzer 109 may automatically disable roaming of UEs of the second provider on the entire TAC that the trigger site(s) belongs (e.g., TAC 101), which may be based on the threshold for deactivation of step 140.

At step 142, analyzer 109 may notify the service providers as to which of the first service provider's TAC(s) have been disabled for roaming.

Figure 5:
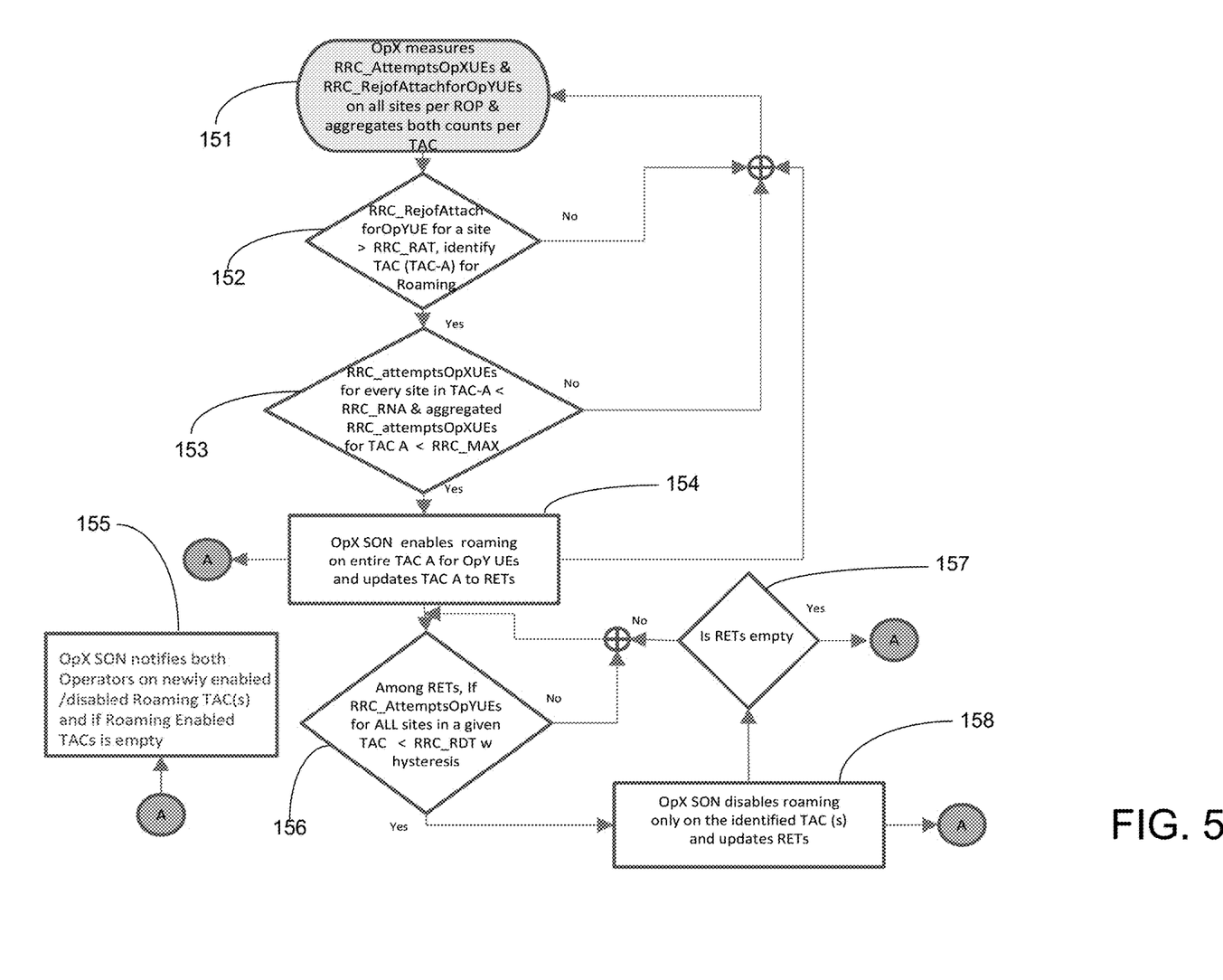
FIG. 5 illustrates an exemplary method for implementing dynamic roaming.

FIG. 5 illustrates another exemplary method for implementing dynamic roaming. At step 151, the first service provider uses analyzer 109 to measure RRC attempts of UE's of a first service provider and RRC rejection of attaches for UE's of the second service provider. At step 152, when the number of RRC rejections of attach for UE of the second service provider is greater than the number of RRC RAT, identify TAC for roaming then proceed to step 153. At step 153, when the number RRC attempts UE of first service provider for the site in TAC 101 is less than the number of RRC RNA and aggregated RRC attempts UEs of first service provider for TAC 101, which is less than the threshold RRC max. At step 154, first service provider's SON enables roaming on entire TAC 101 for UEs of the second service provider and updates TAC 01 for RETs. At step 155, the first service providers notifies both operators on newly enabled/disabled roaming TAC(s) and if roaming enabled TACs is empty. At step 156, among RETS, when the number of RRC attempts UEs of a second service provider for all sites in a given TAC is less than the threshold number RRC RD with hysteresis then go to step 158. At step 158, the first service provider SON disables roaming only on the identified TAC(s) and updates RETs; also go to step 155. At step 157, when RETs empty then step 155.

The disclosed subject matter may create a consistent awareness of the status of peer operators' networks and quickly identify when a deviation has occurred. This awareness may increase the insights of the home operator and may speed time to action with regard to needed roaming enablement. The disclosed subject matter may be used for competitive intelligence and actions on a site level, such as: 1) sending marketing messages to customer's in the affected area that are having (or previously had) service issues; or 2) creating on demand roaming agreements between service providers, which may be per TAC, base station, or other prescribed area.

Figure 6:
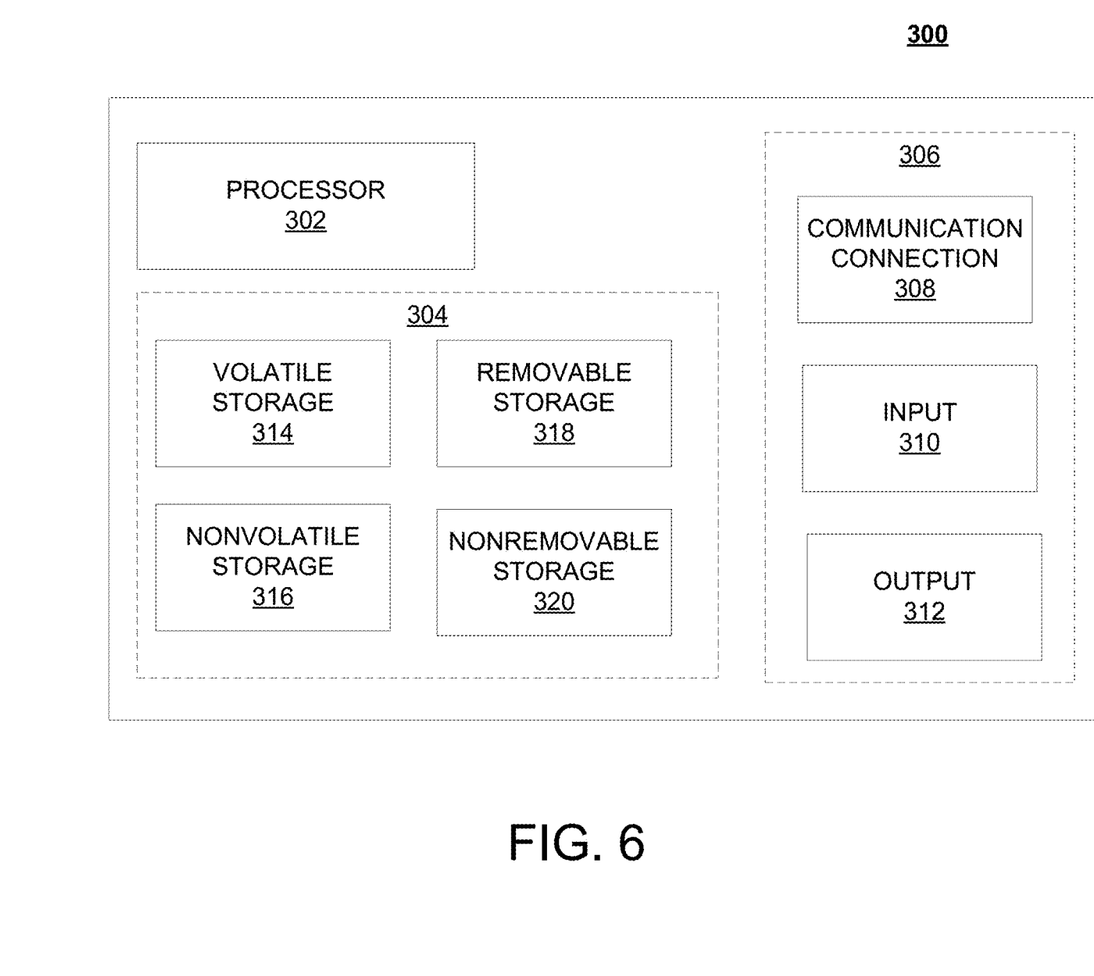
FIG. 6 illustrates a schematic of an exemplary network device.

FIG. 6 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 6) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
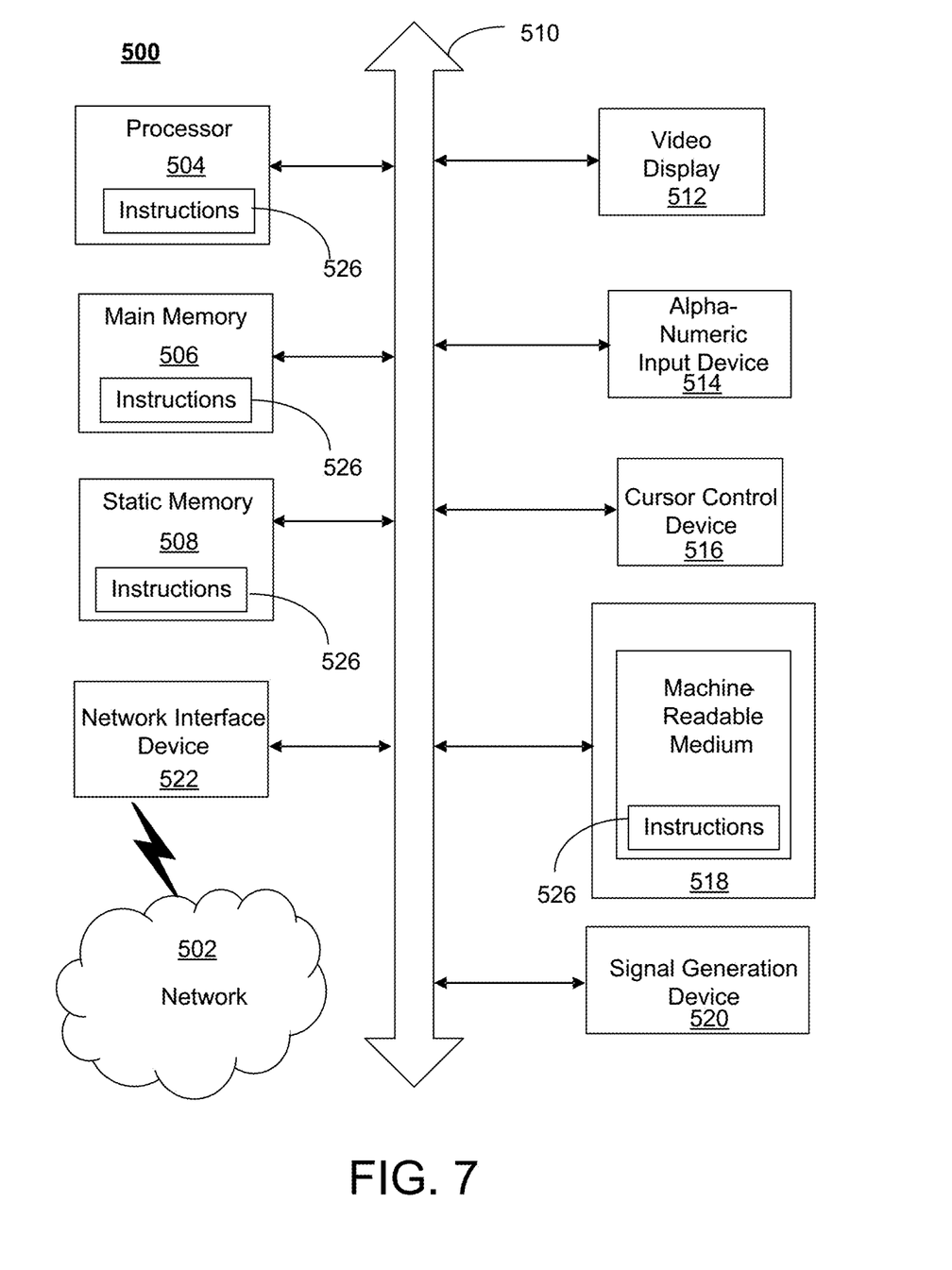
FIG. 7 illustrates an exemplary communication system that provides wireless telecommunication services over wireless communication networks.

FIG. 7 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 102, UE 103, MME 108, base station 104—base station 106, base station 114—base station 116, MME 107 and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which dynamic roaming alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—dynamic roaming—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for dynamic roaming. A method, system, computer readable storage medium, or apparatus provides for receiving an indication of a request to attach to a base station of a first service provider network, wherein the base station is within a tracking area code (TAC); analyzing the request to attach to the base station of the first service provider network; based on the analysis, determining that the request to attach to the first service provider network is indicative of a failure to attach to a second service provider; determining that a threshold number has been crossed of a first type of attach, wherein the first type attach is indicative of the failure to attach to the second service provider, wherein the request to attach to the base station is the first type of attach; and based on the threshold number being crossed, providing instructions to configure the first service provider network (e.g., an MME or other device) to allow roaming for one or more user equipment of the second provider network. The providing instructions to configure the base station to allow roaming for the one or more user equipment of the second provider network may be further based on network bandwidth of the base station is within a bandwidth threshold. All combinations in this paragraph (including the removal or addition of steps) are contemplated in a manner that is consistent with the other portions of the detailed description.

What is claimed:

1. A method comprising:
   receiving an indication of a request to attach to a base station of a plurality of base stations of a first service provider network;
   analyzing the request to attach to the base station of the first service provider network;
   based on the analyzing, determining that the request to attach to the base station of the first service provider network is indicative of a failure to attach to a second service provider network which is indicative of a first type of attach;
   determining that a first threshold number has been crossed of the first type of attach over a period, resulting in a first determination;
   determining that a second threshold number has not been crossed of a combination of the first type of attach and a second type of attach, resulting in a second determination, the second type of attach corresponding to failures to attach to the first service provider network; and
   based on the first determination and the second determination, providing instructions to configure the first service provider network to allow roaming for one or more user equipment of the second service provider network, the allowed roaming being designated in the instructions for some, but less than all, of the plurality of base stations of the first service provider network.

2. The method of claim 1, wherein the base station is within a tracking area code (TAC).

3. The method of claim 1, further comprising:
   determining that a third threshold number has been reached indicating a decrease in a number of the first type of attach within a second period; and
   sending, based on the determining that the third threshold number has been reached, a notification to disable roaming for the one or more user equipment of the second service provider network.

4. The method of claim 1, further comprising sending one or more notifications to the one or more user equipment, wherein the notifications are from a mobility management entity (MME).

5. The method of claim 1, wherein the providing instructions to configure the first service provider network to allow roaming for the one or more user equipment of the second service provider network is further based on a network bandwidth of the base station being within a bandwidth threshold.

6. The method of claim 1, wherein the first threshold number has been crossed of the first type of attach is for a plurality of user equipment for the second service provider network.

7. An apparatus comprising:
   a processor; and
   a memory coupled with the processor, the memory storing executable instructions that when executed by the processor cause the processor to effectuate operations comprising:
   receiving an indication of a request to attach to a base station of a plurality of base stations of a first service provider network;
   analyzing the request to attach to the base station of the first service provider network;
   based on the analyzing, determining that the request to attach to the base station of the first service provider network is indicative of a failure to attach to a second service provider network which is indicative of a first type of attach;
   determining that a first threshold number has been crossed of the first type of attach over a period, resulting in a first determination;
   determining that a second threshold number has not been crossed of a combination of the first type of attach and a second type of attach, resulting in a second determination, the second type of attach corresponding to failures to attach to the first service provider network; and
   based on the first determination and the second determination, providing instructions to configure the first service provider network to allow roaming for one or more user equipment of the second service provider network, the allowed roaming being designated in the instructions for some, but less than all, of the plurality of base stations of the first service provider network.

8. The apparatus of claim 7, wherein the base station is within a tracking area code (TAC).

9. The apparatus of claim 7, the operations further comprising:
   determining that a third threshold number has been reached indicating a decrease in a number of the first type of attach within a second period; and
   sending, based on the determining that the third threshold number has been reached, a notification to disable roaming for the one or more user equipment of the second service provider network.

10. The apparatus of claim 7, the operations further comprising sending one or more notifications to the one or more user equipment.

11. The apparatus of claim 7, wherein the providing instructions to configure the first service provider network to allow roaming for the one or more user equipment of the second service provider network is further based on a network bandwidth of the base station being within a bandwidth threshold.

12. The apparatus of claim 7, wherein the first threshold number has been crossed of the first type of attach is for a plurality of user equipment for the second service provider network.

13. The apparatus of claim 7, wherein the first type of attach comprises a radio resource control attempt.

14. A non-transitory computer readable storage medium storing computer executable instructions that when executed by a computing device cause said computing device to effectuate operations comprising:
   receiving an indication of a request to attach to a base station of a plurality of base stations of a first service provider network;
   analyzing the request to attach to the base station of the first service provider network;

based on the analyzing, determining that the request to attach to the first service provider network is indicative of a failure to attach to a second service provider network which is indicative of a first type of attach;

determining that a first threshold number has been crossed of the first type of attach over a period, resulting in a first determination;

determining that a second threshold number has not been crossed of a combination of the first type of attach and a second type of attach, resulting in a second determination, the second type of attach corresponding to failures to attach to the first service provider network; and based on the first determination and the second determination, providing instructions to configure the first service provider network to allow roaming for one or more user equipment of the second service provider network, the allowed roaming being designated in the instructions for some, but less than all, of the plurality of base stations of the first service provider network.

15. The non-transitory computer readable storage medium of claim 14, wherein the base station is within a tracking area code (TAC).

16. The non-transitory computer readable storage medium of claim 14, the operations further comprising:

determining that a third threshold number has been reached indicating a decrease in a number of the first type of attach within a second period; and sending, based on the determining that the third threshold number has been reached, a notification to disable roaming for the one or more user equipment of the second service provider network.

17. The non-transitory computer readable storage medium of claim 16, wherein the first threshold number and the third threshold number are different.

18. The non-transitory computer readable storage medium of claim 14, wherein the operations are executed by a mobility management entity (MME).

19. The non-transitory computer readable storage medium of claim 14, wherein the providing instructions to configure the first service provider network to allow roaming for the one or more user equipment of the second service provider network is further based on a determination that a network bandwidth of the base station is within a bandwidth threshold.

20. The non-transitory computer readable storage medium of claim 14, wherein the allowed roaming enables the one or more user equipment to only perform emergency calls via the first service provider network.

* * * * *